United States Patent
Noguchi et al.

(10) Patent No.: US 8,544,981 B2
(45) Date of Patent: Oct. 1, 2013

(54) SEALING TAPE FOR INK JET RECORDING HEAD AND INK JET RECORDING HEAD USING THE SAME

(75) Inventors: Mitsutoshi Noguchi, Tokyo (JP); Tadayoshi Inamoto, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/763,045

(22) Filed: Apr. 19, 2010

(65) Prior Publication Data

US 2010/0295888 A1 Nov. 25, 2010

(30) Foreign Application Priority Data

May 25, 2009 (JP) ................................. 2009-125327

(51) Int. Cl.
*B41J 2/165* (2006.01)

(52) U.S. Cl.
USPC ............................................. 347/29; 347/22

(58) Field of Classification Search
USPC ............................................. 347/22, 29, 108
See application file for complete search history.

(56) References Cited

U.S. PATENT DOCUMENTS

| | | | |
|---|---|---|---|
| 4,688,052 A | 8/1987 | Inamoto et al. | |
| 4,688,053 A | 8/1987 | Noguchi et al. | |
| 4,688,054 A | 8/1987 | Inamoto et al. | |
| 4,716,945 A | 1/1988 | Aoki et al. | |
| 4,792,584 A * | 12/1988 | Shiraki et al. | 524/77 |
| 5,086,307 A | 2/1992 | Noguchi et al. | |
| 5,262,802 A | 11/1993 | Karita et al. | |
| 5,558,975 A | 9/1996 | Noguchi et al. | |
| 5,571,659 A | 11/1996 | Noguchi et al. | |
| 5,578,417 A | 11/1996 | Noguchi et al. | |
| 5,578,418 A | 11/1996 | Noguchi et al. | |
| 5,777,039 A | 7/1998 | De Craene et al. | |
| 5,781,208 A | 7/1998 | Karita et al. | |
| 5,850,238 A | 12/1998 | Karita et al. | |
| 6,130,696 A | 10/2000 | Mashita et al. | |
| 7,044,475 B2 | 5/2006 | Imai et al. | |
| 2003/0052939 A1 * | 3/2003 | Farr et al. | 347/29 |

(Continued)

FOREIGN PATENT DOCUMENTS

| | | |
|---|---|---|
| CN | 1210545 A | 3/1999 |
| CN | 1640903 A | 7/2005 |
| JP | 3-234659 A | 10/1991 |

(Continued)

OTHER PUBLICATIONS

Chinese Office Action dated Jul. 4, 2012 in Chinese Application No. 201010179777.0.

*Primary Examiner* — Geoffrey Mruk (74) *Attorney, Agent, or Firm* — Fitzpatrick, Cella, Harper and Scinto (57) ABSTRACT

A sealing tape for an ink jet recording head, detachably adhered to the surface of a chip which is provided on an ink jet recording head and on which a discharge port for discharging ink is formed, includes: a base layer; and an adhesive layer on the base layer, the adhesive layer consisting of: (1) 70 to 100 wt % of (A)-(B)-(A) block copolymers which have no unsaturated carbon bond and consist of (a) vinyl aromatic compound units and (b) olefinic hydrocarbon units where (A) is a polymer block consisting of the (a) units and (B) is a polymer block consisting of the (b) units; and (2) 0 to 30 wt % of polyolefin, wherein the content of the (a) vinyl aromatic compound units in the (1) (A)-(B)-(A) block copolymers is 10 to 30 wt %.

14 Claims, 2 Drawing Sheets

(56) References Cited

U.S. PATENT DOCUMENTS

| | | |
|---|---|---|
| 2007/0064059 A1 | 3/2007 | Inamoto et al. |
| 2007/0263034 A1 | 11/2007 | Yoshihira et al. |
| 2008/0271846 A1* | 11/2008 | Krawinkel et al. ........... 156/327 |

FOREIGN PATENT DOCUMENTS

| | | |
|---|---|---|
| JP | 3-248849 A | 11/1991 |
| JP | 5-84925 A | 4/1993 |
| JP | 8-73699 A | 3/1996 |
| JP | 2002-226666 A | 8/2002 |
| JP | 3346906 B2 | 11/2002 |
| JP | 2007-301769 A | 11/2007 |
| JP | 2007-326965 A | 12/2007 |
| JP | 4146484 B2 | 9/2008 |
| JP | 4160096 B2 | 10/2008 |

* cited by examiner

SEALING TAPE FOR INK JET RECORDING HEAD AND INK JET RECORDING HEAD USING THE SAME

BACKGROUND OF THE INVENTION

1. Field of the Invention

The present invention relates to a sealing tape for an ink jet recording head detachably adhered to protect the surface of a chip which is provided on an ink jet recording head and on which discharge ports for discharging ink are formed, and also relates to an ink jet recording head using such a sealing tape.

2. Description of the Related Art

The discharge ports of an ink jet recording head are open to the atmosphere since ink is discharged therefrom during usage. On the other hand, during the non-usage times, the surface of the ink jet recording head on which the discharge ports are arranged is capped so as to prevent clogging of the discharge ports resulting from evaporation of ink solvent through the discharge ports and contact-related damage.

The discharge ports can be protected by capping when the ink jet recording head is mounted on an apparatus such as a printer. However, when the ink jet recording head is not mounted on an apparatus, in particular, when it is being transported, it is necessary to prevent evaporation of ink solvent and contact-related damage by other means. For this reason, the chip surface including the ink discharge ports is generally protected by a sealing tape having adhesive properties as described in U.S. Pat. Nos. 5,262,802, 5,781,208, 5,850,238, or Japanese Patent Application Laid-Open No. H03-248849.

Japanese Patent Application Laid-Open No. 2007-326965 describes that an acrylic adhesive, a silicon-based adhesive, a rubber-based adhesive (e.g., adhesives containing natural rubber, synthetic rubber, reclaimed rubber, thermosetting rubber, styrene-isoprene-styrene), and a petrolatum-based adhesive can be used as the adhesive layer of the sealing tape.

However, if the sealing tape adhered to the ink jet recording head has too strong an adhesive strength, the ink jet recording head may be damaged when the sealing tape is detached. For this reason, U.S. Patent Application Publication No. 2007/263034 describes a technique for changing the adhesive strength of the sealing tape depending on the position on the discharge port surface.

In recent years, demands for higher resolution image recording have increased, and it is necessary to decrease the amount of ink discharged from the discharge ports of the ink jet recording head to increase resolution.

In a typical ink jet recording head, a resin film is formed on a substrate on which discharge energy generating elements such as heaters or piezoelectric elements are formed, and ink channels are formed in the resin so as to correspond to a predetermined number of discharge energy generating elements. Then, discharge ports are formed by communicating the respective channels to the resin surface. Such an ink jet recording head has a hollow structure in which channels and the discharge energy generating elements such as heaters are formed inside the peripheries of the discharge ports.

In the ink jet recording head having the described structure, the distances between the discharge energy generating elements such as heaters and the discharge ports affect the ink discharge amount, and the distances can be determined by the thickness of the resin film. For this reason, in order to decrease the amount of ink discharged from the discharge ports to increase resolution, it is necessary to decrease the thickness of the resin film that forms the discharge ports.

Furthermore, when the discharge ports are formed to be closer to each other, the hollow structure at the peripheries of the discharge ports tends to have a higher hollow ratio. As a result, the resin film that forms the discharge ports may become weak against external stress. Therefore, it is necessary to adjust the adhesive strength of the sealing tape for the ink jet recording head adhered to the resin film to the extent that it will not damage the resin film when detached. For example, an extremely high adhesive strength may cause damage to the ink jet recording head when the sealing tape is detached.

In general, adhesives fluidize with time right after being adhered to an adherend and spread out to infiltrate the adherend, thus increasing the contact area and increasing its adhesive strength. Similarly, the adhesive strength of the sealing tape using an adhesive increases with time during storage for transportation right after being adhered to the chip surface.

As described above, the sealing tape for the ink jet recording head aims to prevent clogging of the discharge ports resulting from evaporation of the ink solvent through the discharge ports and contact-related damage. For this reason, during periods immediately after adhering and before usage, it is necessary to maintain a constant, sufficient adhesive strength so that the sealing tape is not detached due to a lack of adhesive strength. On the other hand, the adhesive strength should be adjusted to the extent that it will not damage the ink jet recording head when detached.

If the sealing tape is designed to have a sufficient adhesive strength right after adhering, since the adhesive strength increases after temporal change, there is a concern of damage to the ink jet recording head at the time of detachment. On the contrary, if the adhesive strength increased after temporal change is adjusted to the extent that it will not damage the ink jet recording head, there is a concern of a lack in the adhesive strength right after adhering. Since the hollow ratio of the hollow structure at the peripheries of the discharge ports increases with the increased demand for higher resolution image recording, it is expected that this tendency will become more conspicuous.

As described in U.S. Patent Publication No. 2007/263034, a technique has been used hitherto as a countermeasure in which the adhesive strength of the sealing tape is changed depending on the position of the discharge port surface. However, this countermeasure will result in increased number of production steps, thus complicating the process, and requires more expensive facilities. Thus, further improvement is desirable.

Although various adhesives have been studied to solve these problems, in the case of sealing tapes for the ink jet recording head, it is necessary to suppress deterioration of the adhesive resulting from reactions (attack) with ink components being used, in addition to adjustment of the adhesive strength described above. Moreover, there are various limitations in maintaining the characteristics of ink being used; for example, it is necessary to reduce the components eluted from the adhesive. Therefore, regarding adhesives used in the ink jet recording head, a unique adhesive composition is essential.

SUMMARY OF THE INVENTION

An object of the present invention is to provide a sealing tape for the ink jet recording head having sufficient adhesive strength for sealing discharge ports that discharges ink from an ink jet recording head and capable of suppressing an increase in the adhesive strength resulting from a temporal change.

Another object of the present invention is to provide a sealing tape for the ink jet recording head capable of suppressing deterioration of the adhesive resulting from interactions with ink components being used and reducing the components eluted from the adhesive so as to maintain the ink characteristics.

According to an aspect of the present invention, there is provided a sealing tape for an ink jet recording head, detachably adhered to the surface of a chip which is provided on an ink jet recording head and on which a discharge port for discharging ink are formed, the sealing tape for the ink jet recording head including:

a base layer; and an adhesive layer on the base layer, the adhesive layer consisting of; (1) 70 to 100 wt % of (A)-(B)-(A) block copolymers which have no unsaturated carbon bond and consist of (a) vinyl aromatic compound units and (b) olefinic hydrocarbon units where (A) is a polymer block consisting of the (a) units and (B) is a polymer block consisting of the (b) units; and (2) 0 to 30 wt % of polyolefin, wherein the content of the (a) vinyl aromatic compound units in the (1) (A)-(B)-(A) block copolymers is 10 to 30 wt %.

In the sealing tape for the ink jet recording head, the (b) olefinic hydrocarbon units may have a cross-linking functional group, and the adhesive layer contains a cross-linking agent that makes a reaction with the cross-linking functional group.

In the sealing tape for the ink jet recording head, the cross-linking functional group may be an epoxy group or an oxetanyl group.

In the sealing tape for the ink jet recording head, the (2) polyolefin may be polyethylene or polypropylene.

In the sealing tape for the ink jet recording head, the Tg of the polymer block (A) consisting of the (a) vinyl aromatic compound units may be equal to or higher than 120° C., and wherein the Tg of the polymer block (B) consisting of the (b) olefinic hydrocarbon units may be equal to or lower than 0° C.

In the sealing tape for the ink jet recording head, polyolefin may be used as a base resin of the base layer, and the sealing tape may be produced by double-layer coextrusion of the adhesive layer and the base layer.

In the sealing tape for the ink jet recording head, the (1) (A)-(B)-(A) block copolymers may be dynamically cross-linked at the time of the double-layer coextrusion of the adhesive layer and the base layer.

In the sealing tape for the ink jet recording head, the base resin of the base layer may be polyethylene or polypropylene.

According to another aspect of the present invention, there is provided an ink jet recording head in which the sealing tape for the ink jet recording head set out in the foregoing is detachably adhered to the chip surface.

According to the aspects of the present invention, it is possible to provide a sealing tape for the ink jet recording head capable of having enough adhesive power to seal the discharge port of the ink jet recording head and suppressing increase of the adhesive power caused by aging.

Moreover, according to the aspects of the present invention, it is possible to provide a sealing tape for the ink jet recording head capable of suppressing deterioration of the adhesive resulting from interactions with ink components being used and reducing the components eluted from the adhesive so as to maintain the ink characteristics.

Further features of the present invention will become apparent from the following description of exemplary embodiments with reference to the attached drawings.

DESCRIPTION OF THE EMBODIMENTS

Ink Jet Recording Head

Exemplary embodiments of the present invention will now be described with reference to the drawings.

Figure 1:
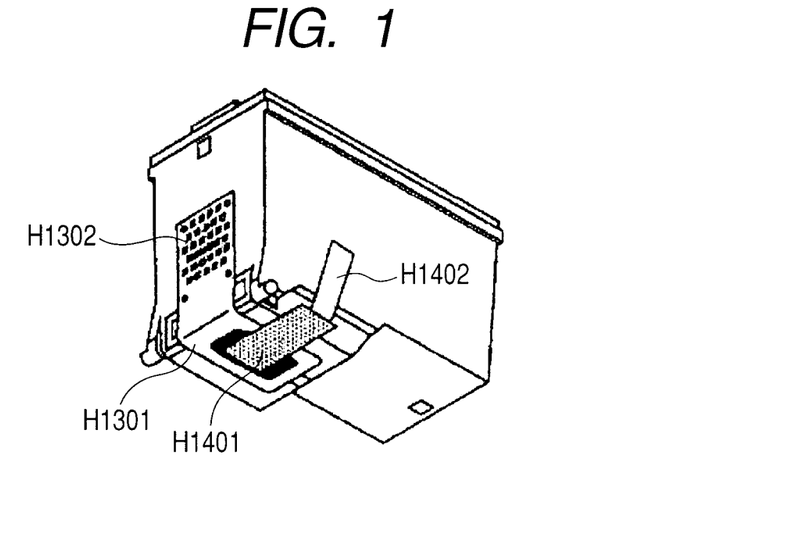
FIG. 1 is a perspective diagram illustrating an ink jet recording head to which a sealing tape for the ink jet recording head according to an embodiment of the present invention is adhesively adhered.

Referring to FIG. 1, an example of an ink jet recording head to which a sealing tape for the ink jet recording head according to the present invention is applied is illustrated. The ink jet recording head is an ink tank integrated head, in which the ink tank is filled with ink. Moreover, a sealing tape H1401 for protecting a discharge port or discharge ports is adhesively adhered to the surface of the discharge ports so as to cover at least the discharge ports. That is, FIG. 1 illustrates the form of an ink jet recording head during its transportation, in which the discharge ports are sealed by the sealing tape H1401. However, the present invention can be equally applied to an ink tank-separated ink jet recording head.

Figure 2:
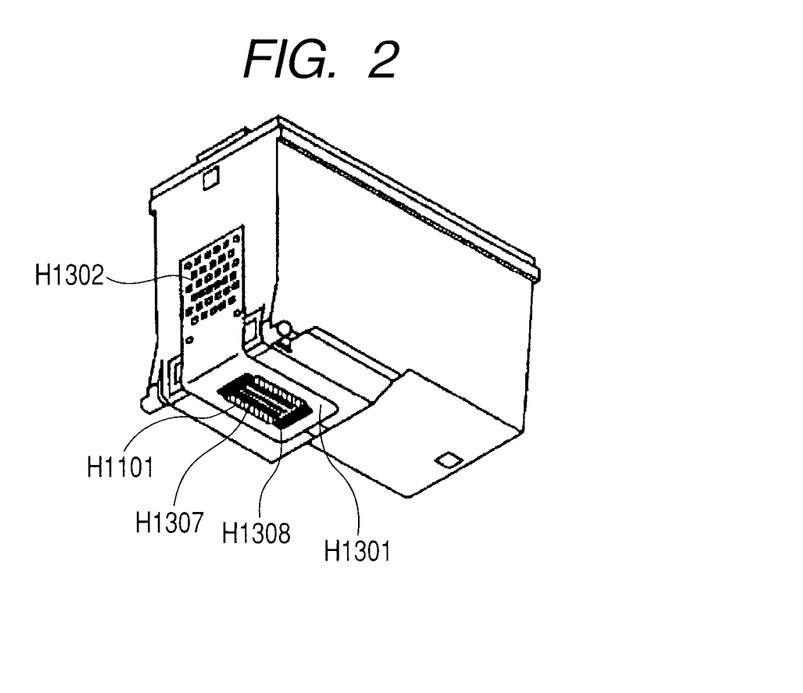
FIG. 2 is a perspective diagram illustrating the ink jet recording head according to the embodiment of the present invention.

Hereinafter, constituent elements will be described in detail. FIG. 2 is a perspective diagram illustrating a structure of an ink jet recording head. On a recording element board (chip) H1101, ink channels and discharge ports are formed by a photolithography process. An electrical wiring tape H1301 is prepared, for example, by forming copper wirings on a polyimide film so as to form a path through which electrical signals for ink discharge are applied to the recording element board H1101. The electrical signals are supplied from a printer body via an external signal input terminal H1302. The ink jet recording head has a casing which is formed by resin molding, and on which the recording element board H1101 and the electrical wiring tape H1301 are mounted. The recording element board H1101 is sealed by sealing materials H1307 and H1308.

During the transportation, as illustrated in FIG. 1, in order to protect the discharge ports, the sealing tape H1401 is detachably adhered to the surface of the chip H1101 having the discharge ports formed thereon. Moreover, a tag tape H1402 is adhered to facilitate detaching of the sealing tape H1401. Since the discharge ports are sealed by the sealing tape H1401, the discharge ports can be protected, and leaking of ink from the discharge ports resulting from temperature or pressure variation during transportation can be prevented.

Sealing Tape for Ink Jet Recording Head

A sealing tape for the ink jet recording head according to the present invention includes a base layer and an adhesive layer disposed on the base layer to be adhered to the chip surface. The adhesive layer consists of (1) (A)-(B)-(A) block copolymers and (2) polyolefin.

An adhesive using the (A)-(B)-(A) block copolymers typically contain a tackifier and a flexibilizer. This is because the (A)-(B)-(A) block copolymers solely can hardly secure adhesive strength, and the adhesive strength is provided by a tackifier such as a terpene-based resin. Moreover, to improve moldability, a flexibilizer such as paraffin needs to be added. As a result, when an adhesive having a typical composition is used in an adhesive layer of a sealing tape for the ink jet recording head, an undesirable situation may occur in which additives such as the tackifier or flexibiizer are eluted into the ink to change the characteristics of the ink or the additives remain at the vicinity of the ink discharge ports. In the present invention, the adhesive is prepared with only the (1) (A)-(B)-(A) block copolymers and the (2) polyolefin so as to be usable in the adhesive layer of the sealing tape for the ink jet recording head, which is a main feature of the present invention.

(1) (A)-(B)-(A) Block Copolymer

The (1) (A)-(B)-(A) block copolymers consist of (a) vinyl aromatic compound units and (b) olefinic hydrocarbon units. Here, (A) is a polymer block consisting of the (a) vinyl aromatic compound units, and (B) is a polymer block consisting of the (b) olefinic hydrocarbon units.

Examples of the (a) vinyl aromatic compound units usable in the present invention include styrene, α-methylstyrene, 4-acetylstyrene, 3-(4-diphenyl)styrene, 4-(4-diphenyl)styrene, 4-bromostyrene, 4-tert-butylstyrene, 4-chloro-2-methylstyrene, 4-chloro-3-methylstyrene, 2-chlorostyrene, 3-chlorostyrene, 4-chlorostyrene, 2,4-dichlorostyrene, 2,5-dichlorostyrene, 2,6-dichlorostyrene, 3,4-dichlorostyrene, 2-ethylstyrene, 2-methylstyrene, 3-methylstyrene, 4-methylstyrene, 2,4-dimethylstyrene, 2,5-dimethylstyrene, 3,4-dimethylstyrene, 3,5-dimethylstyrene, 4-phenylstyrene, 1-naphthylethylene, and 2-naphthylethylene. The polymer block (A) may include only one kind, or a plurality of kinds, of these examples of the (a) vinyl aromatic compound units. In the (1) (A)-(B)-(A) block copolymers used in the present invention, it is preferable that the (a) vinyl aromatic compound unit is styrene.

As the (b) olefinic hydrocarbon units, olefins having a carbon number of 10 or smaller and containing only a single bond can be used. Moreover, a unit consisting of dienic hydrocarbons in which a double bond is modified to a single bond by means of hydrogenation can be used. The hydrogenation can be achieved by an existing technique.

Examples of a specific structural unit of the (b) olefinic hydrocarbon units and a structural unit before hydrogenation include ethylene, propylene, butylene, isobutylene, pentene, hexene, octene, butadiene, isoprene, 1,3-pentadiene, 2,3-dimethyl-1,3-butadiene, piperylene, 3-butyl-1,3-octadiene, and phenyl-1,3-butadiene. The polymer block (B) may include only one kind, or a plurality of kinds, of these examples of the (b) olefinic hydrocarbon units.

Moreover, the (1) (A)-(B)-(A) block copolymers according to the present invention do not contain an unsaturated carbon bond. The adhesive layer of the sealing tape in the present invention may sometimes come into contact with ink during storage for transportation. Therefore, in order to suppress deterioration of the adhesive resulting from attack of the ink components, it is necessary that the (A)-(B)-(A) block copolymers do not contain an unsaturated carbon bond.

A specific example of the (1) (A)-(B)-(A) block copolymers used in the present invention includes a styrene-butadiene-styrene block copolymer a styrene-isoprene-styrene block copolymer and a styrene-butadiene isoprene-styrene block copolymer which are completely hydrogenated. A specific example thereof includes styrene-ethylene/butylene-styrene copolymers (SEBS), styrene-ethylene/propylene-styrene copolymers (SEPS), styrene-ethylene/ethylene/propylene-styrene copolymers (SEEPS), and styrene-isobutylene-styrene copolymers (SIBS). Exemplary structures of the (1) (A)-(B)-(A) block copolymers used in the present invention are illustrated in Chemical Formulas (1) to (4) below.

Chemical Formula 1

Chemical Formula 2

Chemical Formula 3

Chemical Formula 4

In Chemical Formulas (1) to (4) above, k, l, m, and n are arbitrary positive integers.

The content of the polymer block (A) consisting of the (a) vinyl aromatic compound units in the (1) (A)-(B)-(A) block copolymers of the present invention is 10 to 30 wt %. If the content of the polymer block (A) consisting of the (a) vinyl aromatic compound unit is smaller than 10 wt %, the fluidity of the adhesive will increase and thus the temporal change in the adhesive strength will increase. On the other hand, if the content exceeds 30 wt %, it is difficult to obtain a sufficient adhesive strength unless the adhesive contains a tackifier. Therefore, the content is preferably 10 to 25 wt %.

Moreover, it is preferable that the (b) olefinic hydrocarbon unit has a cross-linking functional group. In the present invention, the cross-linking functional group can be an epoxy group or an oxetanyl group. As the (b) olefinic hydrocarbon unit having the cross-linking functional group, a dienic hydrocarbon unit can be used in which a double bond is partially modified to a single bond by means of hydrogenation and is further modified to an epoxy group by means of epoxidization. Examples of a specific structural unit before hydrogenation or epoxidization include butadiene, isoprene, 1,3-pentadiene, 2,3-dimethyl-1,3-butadiene, piperylene, 3-butyl-1,3-octadiene, and phenyl-1,3-butadiene.

In a hydrogenated block copolymer component obtained by partially hydrogenating a block copolymer consisting of dienic hydrocarbon units, a hydrogenation rate thereof may be equal to or greater than 70%. The hydrogenation can be achieved by an existing technique. Furthermore, by partially epoxidizing the hydrogenated dienic hydrocarbon units, it is possible to obtain (b) olefinic hydrocarbons having a desired epoxy group. The epoxidization can be achieved by an existing technique. Specific examples of the (b) olefinic hydrocarbons having an epoxy group are illustrated in Chemical Formulas (5) to (9) below.

Chemical Formula 5

(5)

Chemical Formula 6

(6)

Chemical Formula 7

(7)

Chemical Formula 8

(8)

Chemical Formula 9

(9)

In Chemical Formulas (5) to (9) above, k, l, m, and n are arbitrary positive integers.

When the (b) olefinic hydrocarbons having the cross-linking functional group are used, the adhesive layer may contain a cross-linking agent that makes a reaction with the cross-linking functional group. When the cross-linking functional group is an epoxy group or an oxetanyl group, an existing cross-linking agent may be used, but it is preferable to use an anhydride-based cross-linking agent and a cationic polymerization initiator. The amount of the added cross-linking agent can be appropriately determined depending on an equivalent weight of the cross-linking functional group within a range where it has no influence on a predetermined effect.

The cross-linking functional group can be cross-linked at the time of molding. In dynamic cross-linking where a cross-linking agent making a reacting with a cross-linking functional group is melt and mixed with an adhesive, since a cross-linking reaction takes place simultaneously with molding, it is desirable because the cross-linking reaction is achieved by a simple method without increasing the number of steps.

The adhesive of the sealing tape according to the present invention has an adhesive strength given by the (1) (A)-(B)-(A) block copolymers. Particularly, since the (B) component contributes to the adhesive property and the (A) component serves as a pseudo cross-linking component by crystallization, the crystal structure of the (1) (A)-(B)-(A) block copolymers can be maintained even when ink comes into contact with the adhesive. However, depending on the purpose of use of the present invention, the adhesive layer may be in contact with ink for a long period, and the structure retaining function by only the (A) component becomes insufficient. Therefore, in some cases, the adhesive layer may deteriorate. Moreover, as will be described later, in some cases, it is difficult to sufficiently suppress the fluidity of the adhesive and to effectively suppress an increase of the adhesive strength resulting from a temporal change. For this reason, by introducing the cross-linking functional group so as to chemically bond the (1) (A)-(B)-(A) block copolymers, a stronger crystal structure can be maintained.

The polymer block (B) according to the present invention preferably contains 0 to 20 wt %, and more preferably, 1 to 10 wt %, of the (b) olefinic hydrocarbon units having a cross-linking functional group. By choosing the content range, it is possible to suppress deterioration of the adhesive layer resulting from the ink attack even when a particular kind of ink is used. Moreover, an increase in the fluidity of the adhesive and the adhesive strength with temporal change can be suppressed, and thus an appropriate adhesive property can be achieved.

The adhesive layer according to the present invention contains 70 to 100 wt % of the (1) (A)-(B)-(A) block copolymers. That is, the total content of the (1) (A)-(B)-(A) block copolymers and the (2) polyolefin is 100 wt %. Preferably, the content of the (1) (A)-(B)-(A) block copolymers is 85 to 99 wt %.

(2) Polyolefin

The adhesive layer according to the present invention further contains the (2) polyolefin. Thus, it is possible to maintain a stronger crystal structure and to suppress deterioration of the adhesive layer. Moreover, by containing the (2) polyolefin in the adhesive layer, it is possible to improve adhesive properties with a base layer when polyolefin is used as a base resin of the base layer of the sealing tape.

As the (2) polyolefin used in the present invention, polyolefins having a carbon number of 10 or smaller and including olefins can be used. Among such polyolefins, polyethylene or polypropylene can be used.

The adhesive layer according to the present invention contains 0 to 30 wt % of the (2) polyolefin. As described above, the total content of the (1) (A)-(B)-(A) block copolymers and the (2) polyolefin is 100 wt %. Preferably, the content of the (2) polyolefin is 1 to 15 wt %. If the content of the (2) polyolefin exceeds 30 wt %, the adhesive layer will not exhibit adhesive properties and is difficult to be used for a sealing tape. Although the advantage of the present invention can be obtained even when the adhesive layer according to the present invention does not contain the (2) polyolefin and consists of only the (1) (A)-(B)-(A) block copolymers, the adhesive layer can contain the (2) polyolefin in the content range from the perspective of maintaining the crystal structure.

In the (1) (A)-(B)-(A) block copolymers used in the present invention, it is preferable that the Tg of the polymer block (A) consisting of the (a) vinyl aromatic compound units is equal to or higher than 70° C., and the Tg of the polymer block (B) consisting of the (b) olefinic hydrocarbon units is equal to or lower than 0° C.

The (1) (A)-(B)-(A) block copolymers are designed such that the polymer block (A) exhibits the crystal properties inherent to an aromatic ring and the polymer block (B) exhibits the adhesive properties inherent to the olefinic hydrocarbons. Moreover, the sealing tape for the ink jet recording head according to the present invention needs to exhibit sufficient adhesive properties in the range of temperatures used and the range of temperatures during the transportation. Since the adhesive exhibits adhesive properties in temperatures equal to or higher than Tg, it is necessary that the polymer block (B) has Tg to be equal to or lower than the range of temperatures used and the range of temperatures during the transportation and has fluidity contributing to the adhesive properties. For this reason, it is preferable that the Tg of the polymer block (B) is equal to or lower than 0° C.

Moreover, adhesives fluidize with time right after being adhered to an adherend and spread out to infiltrate the adherend, thus increasing the contact area and increasing its adhesive strength. Similarly, the adhesive strength of the sealing tape using an adhesive increases with time during storage for transportation right after being adhered to the chip surface. If an increase in the adhesive strength is too great, the ink jet recording head may be damaged when the sealing tape is detached. For this reason, the sealing tape for the ink jet recording head according to the present invention needs to suppress the increase in the adhesive strength resulting from a temporal change.

The increase in the adhesive strength resulting from the temporal change arises from the fluidity of the adhesive component. When the Tg of the adhesive is set to be equal to or lower than the range of temperatures used, the adhesive will be used in a high fluidity state. Therefore, the adhesive will fluidizes with time and easily spread out on the surface of an adherend. As a result, the contact area between the adhesive and the adherend increases, and the adhesive strength will increase.

Therefore, in the sealing tape for the ink jet recording head according to the present invention, it is important to suppress the fluidity of the adhesive to an appropriate extent in order to suppress the increase in the adhesive strength resulting from a temporal change. For this reason, it is preferable that the polymer block (A) consisting of the (a) vinyl aromatic compound units has Tg which is equal to or higher than the range of temperatures used and the range of temperatures during the transportation. That is, the Tg of the polymer block (A) is preferably equal to or higher than 70° C.

As described above, the (1) (A)-(B)-(A) block copolymers exhibit adhesive properties since the Tg of the polymer block (B) consisting of the (b) olefinic hydrocarbon units is equal to or lower than 0° C. Moreover, since the Tg of the polymer block (A) consisting of the (a) vinyl aromatic compound units is equal to or higher than 70° C., the fluidity is suppressed to an appropriate extent in the range of temperatures used and the range of temperatures during the transportation. Furthermore, the polymer block (A) serves as a pseudo cross-linking component by crystallization, thus maintaining the crystal structure. For this reason, an excessive fluidity of the (1) (A)-(B)-(A) block copolymers is suppressed.

For suppression of an excessive fluidity of the (1) (A)-(B)-(A) block copolymers, the content of the polymer block (A), the content of the polymer block (B), and the content of the (2) polyolefin are important factors. Therefore, as described above, the content of the polymer block (A) consisting of the (a) vinyl aromatic compound units in the (1) (A)-(B)-(A) block copolymers is set to be equal to or greater than 10 wt % and equal to or smaller than 30 wt %. Preferably, the content of the polymer block (A) is equal to or greater than 10 wt % and equal to or smaller than 25 wt %. Moreover, the content of the (2) polyolefin is 0 to 30 wt %, and preferably 1 to 15 wt %. Moreover, when the polymer block (B) contains the (b) olefinic hydrocarbon units having a cross-linking functional group, it is preferable that the polymer block (B) contains 0 to 20 wt %, and more preferably, 1 to 10 wt %, of the (b) olefinic hydrocarbon units having the cross-linking functional group. As a result, the sealing tape for the ink jet recording head according to the present invention has a sufficient adhesive strength and is able to suppress the increase in the adhesive strength resulting from a temporal change.

Furthermore, in the (1) (A)-(B)-(A) block copolymers used in the present invention, it is preferable that the Tg of the polymer block (A) consisting of the (a) vinyl aromatic compound units is equal to or higher than 120° C., and the Tg of the polymer block (B) consisting of the (b) olefinic hydrocarbon units is equal to or lower than 0° C. More preferably, in the (1) (A)-(B)-(A) block copolymers, the Tg of the polymer block (A) consisting of the (a) vinyl aromatic compound units is equal to or higher than 120° C. and equal to or lower than 300° C., and the Tg of the polymer block (B) consisting of the (b) olefinic hydrocarbon units is equal to or higher than −50° C. and equal to or lower than 0° C.

Typically, in many cases, the change in the fluidity appears smoothly near the Tg, and even when the Tg is set to be equal to or higher than the range of temperatures used and the range of temperatures during the transportation, the fluidity starts appearing gradually at temperatures below the temperature range. For this reason, it is necessary to set the Tg to higher temperatures in order to further suppress the fluidity in the range of temperatures used and the range of temperatures during the transportation. Since the Tg of the polymer block (A) consisting of the (a) vinyl aromatic compound units is set to be equal to or higher than 120° C., it is possible to suppress the temporal change even when the storage period for transportation is increased, thus increasing the reliability of the sealing tape.

Examples of such (a) vinyl aromatic compound units include 3-(4-diphenyl)styrene, 4-(4-diphenyl)styrene, 4-tert-butylstyrene, 4-chloro-2-methylstyrene, 2,4-dichlorostyrene, 2,6-dichlorostyrene, 3,4-dichlorostyrene, 2-methylstyrene, 2,5-dimethylstyrene, 4-phenylstyrene, 1-naphthylethylene, 2-naphthylethylene. The polymer block (A) may include only one kind, or a plurality of kinds, of these examples of the (a) vinyl aromatic compound units.

When such a polymer block (A) is used and the polymer block (B) includes the (b) olefinic hydrocarbon units having the cross-linking functional group, chemical bonds between the (1) (A)-(B)-(A) block copolymers will be generated. In this way, it is possible to suppress the fluidity at higher temperatures. For this reason, it is possible to suppress the temporal change even when the storage period for transportation is increased, thus increasing the reliability of the sealing tape.

Figure 3:
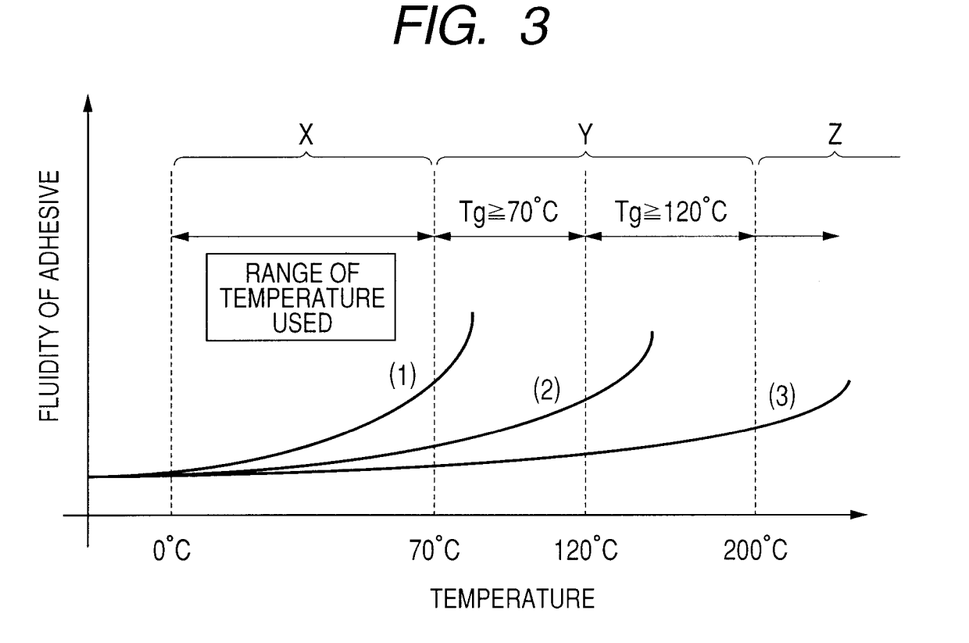
FIG. 3 is a graph illustrating the relationship between the form of the adhesive according to an embodiment of the present invention, the fluidity of the adhesive, and the environmental temperature.

FIG. 3 is a graph illustrating the relationship between the form of the adhesive according to the present invention, the fluidity of the adhesive, and the environmental temperature. Typically, the sealing tape is used in the range of 0 and 70° C. as illustrated in FIG. 3. In the (1) (A)-(B)-(A) block copolymers used in the present invention, the Tg of the polymer block (A) consisting of the (a) vinyl aromatic compound units is typically around 90°, and the fluidity starts increasing at 70° C. or above as indicated by (1) in FIG. 3. Moreover, when the Tg of the polymer block (A) is set to 120° C. or higher, the fluidity starts increasing at 120° C. or above as indicated by (2) in FIG. 3. Furthermore, when the Tg of the polymer block (A) is set to 120° C. or higher and the polymer block (B) contains the (b) olefinic hydrocarbon units having the cross-linking functional group, the fluidity starts increasing at 200° C. or above as indicated by (3) in FIG. 3. In this way, according to the present invention, it is possible to suppress the increase in the fluidity of the adhesive even when the storage period for transportation is increased. That is, it is possible to suppress the temporal change and to increase the reliability of the sealing tape. In FIG. 3, graph (1) plots the fluidity for the case where the Tg of the polymer block consisting of the (a) units is 90° C., graph (2) plots the fluidity for the case where the Tg of the polymer block consisting of the (a) units is 140° C., and graph (3) plots the fluidity for the case where the polymer block consisting of the (b) units has a cross-linking functional group. In addition, in FIG. 3, "X" indicates the range where the polymer block consisting of the (b) units fluidizes, "Y" indicates the range where the polymer block consisting of the (a) units fluidizes, and "Z" indicates the range where the polymer block having a cross-linking structure and consisting of the (b) units fluidizes.

In the present invention, the Tg was measured by measuring the dynamic viscoelasticity of a sample. In the dynamic viscoelasticity, a cyclic sinusoidal stress wave of a constant frequency is applied to the sample, and distortion and phase shift observed at that time are measured. In this way, the temperature and frequency dependences of a storage elastic modulus E' corresponding to an elasticity component, a loss elastic modulus E" corresponding to a viscosity component, and tan δ (=E"/E') reflecting a vibration absorbing property are calculated. Since the tan δ typically shows the maximum value at temperature near the Tg, in the present invention, the temperature at which the tan δ becomes the maximum is used as the Tg. Moreover, although the tan δ has a frequency dependence, in the present invention, the measurement is made in the range of 1 and 10 Hz.

Method for Producing Sealing Tape for Ink Jet Recording Head

The sealing tape for the ink jet recording head according to the present invention can be produced by double-layer coextrusion of the adhesive layer and the base layer.

Coextrusion molding is a melt-extrusion molding method of extruding a plurality of materials at a time to be shaped into a laminated film. A thermoplastic resin is heated and melted in a cylinder, the molten resin is extruded and laminated from a slit die at the same time and is then shaped through a cooling process. The molding method is classified depending on the die shape and cooling method.

In an inflation method, a die having an annular lip called a ring die is provided at the tip of an extruder, and materials are extruded into a tube shape and shaped continuously. The inflation method includes a front-die lamination method where molten resins come into contact with each other in a feed block in front of a die, an in-die lamination method where molten resins come into contact with each other in a path inside the die, and an out-die lamination method where molten resins come into contact with each other after being extruded from a plurality of concentric lips. An air duct is provided at the center of the ring die, through which compressed air is blown to expand the tube. One end of the die is opened to obtain a flat film, which is cooled while being pulled by pinch rollers, and the film is wound into a roll.

In a T-die method, a die having a linear lip called a T-die is provided at the tip of an extruder, and materials are extruded into a flat shape and shaped continuously. The T-die has a basic structure in which two die pieces are overlapped with each other so that T-shaped slots inscribed on one surface of the die pieces face each other. When molten resin is fed from a portion corresponding to the vertical line of the T-shape, the resin spreads out to both ends of the die via a manifold corresponding to the horizontal line of the T-shape and is then discharged into a film shape through a lip cavity. In a single-manifold method, a feed block is provided right in front of a die, to which a plurality of extruders is connected via an adapter, and resins come into contact with each other inside the feed block, and is then shaped into a film through the die. In a multi-manifold method, a T-die having a plurality of manifolds therein is used, and resins supplied from a plurality of extruders come into contact with each other right in front of a lip portion to obtain a laminated film. The film is cooled through mirror-finished cooling rollers and rolled into a roll.

The sealing tape for the ink jet recording head according to the present invention is characterized in that it is produced by the typical coextrusion molding method described above. According to this method, the manufacturing apparatus and the manufacturing process are simple, and a sealing tape having a high cohesion strength between the base layer and the adhesive layer can be produced. As the base resin of the base layer, polyolefin is preferred, and polyethylene or polypropylene is more preferable. Moreover, by using the same material as the (2) polyolefin contained in the adhesive layer as the base resin of the base layer, it is possible to further increase the cohesion strength between the base layer and the adhesive layer.

In addition to this, a coating solution may be prepared by dissolving an adhesive in an organic solvent and applied to a base layer and dried to form an adhesive layer. In this case, examples of materials usable for the base layer include resin films of polyethylene terephthalate, polyester, and polyimide. In order to improve cohesive properties with adhesive, surface treatment such as plasma treatment or corona discharge treatment, which is widely used, may be conducted on the resin film surface to which the coating solution is applied.

EXAMPLES

Hereinafter, examples of the present invention will be described. Adhesives were prepared according to the compositions given in Table 1 below. Subsequently, double-layer coextrusion of the adhesives and a base resin was performed to form an adhesive layer and a base layer, and sealing tapes for the ink jet recording head of Examples 1 to 18 were produced. The adhesives of Examples to 18 contained a cross-linking agent. As the base resin, polypropylene or polyethylene was used. The adhesive layer had a thickness of 30 μm, and the base layer had a thickness of 80 μm.

TABLE 1

| | (1) (A)-(B)-(A) block copolymer | | | | | | | | | (2) polyolefin | |
|---|---|---|---|---|---|---|---|---|---|---|---|
| | (a) vinyl aromatic compound unit (A) | | | (b) olefinic hydrocarbon unit | | | | | | | |
| | Kind | Content (wt %) | Tg (° C.) | Kind | Content (wt %) | Cross-linking functional group | Content (wt %) | (B) Tg (° C.) | Content (wt %) | Kind | Content (wt %) |
| Example 1 | styrene | 30 | 100 | ethylene/butylene | 70 | — | — | −20 | 95 | polypropylene | 5 |
| Example 2 | styrene | 30 | 100 | ethylene/butylene | 70 | — | — | −20 | 100 | — | 0 |
| Example 3 | styrene | 25 | 100 | ethylene/propylene | 75 | — | — | −25 | 90 | polypropylene | 10 |
| Example 4 | styrene | 20 | 100 | ethylene/butylene | 80 | — | — | −20 | 90 | polypropylene | 10 |
| Example 5 | styrene | 20 | 100 | ethylene/butylene | 80 | — | — | −20 | 95 | polypropylene | 5 |
| Example 6 | styrene | 10 | 100 | ethylene/butylene | 90 | — | — | −20 | 85 | polypropylene | 15 |
| Example 7 | styrene | 20 | 100 | ethylene/butylene | 80 | — | — | −20 | 90 | polyethylene | 10 |
| Example 8 | styrene | 10 | 100 | ethylene/butylene | 90 | — | — | −20 | 70 | polyethylene | 30 |
| Example 9 | 2-methylstyrene | 15 | 136 | ethylene/butylene | 85 | — | — | −20 | 90 | polypropylene | 10 |
| Example 10 | 2-methylstyrene | 15 | 136 | ethylene/butylene | 85 | — | — | −20 | 95 | polypropylene | 5 |
| Example 11 | styrene | 30 | 100 | ethylene/butylene | 70 | epoxy group | 5 | −20 | 100 | — | 0 |
| Example 12 | styrene | 20 | 100 | ethylene/butylene | 80 | epoxy group | 5 | −20 | 95 | polypropylene | 5 |
| Example 13 | styrene | 20 | 100 | ethylene/butylene | 80 | epoxy group | 5 | −20 | 90 | polyethylene | 10 |
| Example 14 | styrene | 10 | 100 | ethylene/propylene | 90 | epoxy group | 10 | −25 | 85 | polypropylene | 15 |
| Example 15 | styrene | 20 | 100 | ethylene/butylene | 80 | oxetanyl group | 5 | −20 | 95 | polypropylene | 5 |
| Example 16 | styrene | 10 | 100 | ethylene/butylene | 90 | oxetanyl group | 5 | −20 | 85 | polypropylene | 15 |
| Example 17 | 2-methylstyrene | 20 | 136 | ethylene/butylene | 80 | epoxy group | 10 | −20 | 100 | — | 0 |
| Example 18 | 2-methylstyrene | 10 | 136 | ethylene/butylene | 90 | epoxy group | 5 | −20 | 90 | polypropylene | 10 |

Moreover, adhesives were prepared according to the compositions given in Table 2 below. Subsequently, similar to Examples, double-layer coextrusion of the adhesives and a base resin was performed to form an adhesive layer and a base layer, and sealing tapes for the ink jet recording head of Comparative Examples 1 to 8, 11, and 12 were produced. The adhesives of Examples 6 to 8 contained a cross-linking agent. As the base resin, polypropylene was used in all cases. The adhesive layer had a thickness of 30 μm, and the base layer had a thickness of 80 μm. For Comparative Examples 1, 3, 4, 6, 7, and 8, paraffin was contained as a flexibilizer. In addition, for Comparative Examples 4 and 8, a terpene-based resin was contained as a tackifier. Moreover, for Comparative Example 5, the Carbon-Carbon double bond was contained in the structure of the (A)-(B)-(A) block copolymers.

TABLE 2

| | (1) (A)-(B)-(A) block copolymer | | | | | | | | | (2) polyolefin | | Additives | | |
|---|---|---|---|---|---|---|---|---|---|---|---|---|---|---|
| | (a) olefinic hydrocarbon units (A) | | | (b) olefinic hydrocarbon units | | | | | | | | | | |
| | Kind | Content (wt %) | Tg (° C.) | Kind | Content (wt %) | Crosslinking functional group | Content (wt %) | (B) Tg (° C.) | Content (wt %) | Kind | Content (wt %) | Kind | | Remarks |
| Comparative Example 1 | styrene | 30 | 100 | ethylene/butylene | 70 | — | — | −20 | 80 | polypropylene | 20 | paraffin | | — |
| Comparative Example 2 | styrene | 50 | 100 | ethylene/butylene | 50 | — | — | −20 | 90 | polypropylene | 10 | — | | — |
| Comparative Example 3 | styrene | 20 | 100 | ethylene/butylene | 80 | — | — | −20 | 100 | — | 0 | paraffin | | — |
| Comparative Example 4 | styrene | 70 | 100 | ethylene/butylene | 30 | — | — | −20 | 100 | — | 0 | paraffin terpene-based resin | | — |
| Comparative Example 5 | styrene | 30 | 100 | isoprene | 70 | — | — | −25 | 100 | — | 0 | — | | Carbon-Carbon double bond was contained in (1) |

TABLE 2-continued

| | (1) (A)-(B)-(A) block copolymer | | | | | | | | (2) polyolefin | | Addi-tives | | |
|---|---|---|---|---|---|---|---|---|---|---|---|---|---|
| | (a) olefinic hydrocarbon units (A) | | | (b) olefinic hydrocarbon units (B) | | | | | | | | | |
| | Kind | Content (wt %) | Tg (° C.) | Kind | Content (wt %) | Crosslinking functional group | Content (wt %) | Tg (° C.) | Content (wt %) | Kind | Content (wt %) | Kind | Remarks |
| Comparative Example 6 | styrene | 30 | 100 | ethylene/butylene | 70 | epoxy group | 30 | −20 | 80 | polypropylene | 20 | paraffin | — |
| Comparative Example 7 | styrene | 50 | 100 | ethylene/butylene | 50 | epoxy group | 5 | −20 | 90 | polypropylene | 10 | paraffin | — |
| Comparative Example 8 | styrene | 70 | 100 | ethylene/butylene | 30 | epoxy group | 5 | −20 | 100 | — | 0 | paraffin terpene-based resin | — |
| Comparative Example 11 | styrene | 30 | 100 | ethylene/butylene | 70 | — | — | −20 | 65 | polypropylene | 35 | — | — |
| Comparative Example 12 | styrene | 35 | 100 | ethylene/butylene | 65 | — | — | −20 | 70 | polypropylene | 30 | — | — |

In addition, for Comparative Example 9, an acrylic adhesive was used as an adhesive. The adhesive was applied to a polyethylene terephthalate film having a thickness of 25 μm and was then heated and dried, whereby a sealing tape having an adhesive layer with a thickness of 30 μm was produced.

In addition, for Comparative Example 10, a silicon-based adhesive obtained through polymerization of dimethylsiloxane was used as an adhesive. The adhesive was applied to a polyethylene terephthalate film having a thickness of 25 μm and was then heated and dried, whereby a sealing tape having an adhesive layer with a thickness of 30 μm was produced.

The sealing tapes were evaluated by the following method. The produced sealing tapes of Examples and Comparative Examples were cut into a desired size and adhered to an discharge port surface (chip surface) of the ink jet recording head. The ink jet recording head was designed to discharge droplets of ink of 2 pl and the diameter Φ of the discharge port was 10 μm. Then, the ink jet recording head with the discharge ports sealed by the sealing tapes were packaged. Immediately after this, the sealing tapes were detached in a direction of 90° at a speed of 0.1 to 10 m/min, and the detaching strength was measured. Since the detaching strength changes depending on the detaching speed, the detaching strength was measured while changing the detaching speed and the maximum value was used as the detaching strength.

Furthermore, a heating test was conducted for the packaged ink jet recording head at 70° C. for one month. After the temperature returned to the room temperature, the detaching strength was measured as described above.

The presence of detaching of the sealing tapes during the storage was observed with the human eyes. Moreover, the presence of the eluted components into ink was observed with respect to the portion of the sealing tape in contact with the adhesive layer. Furthermore, by metallograph analysis, the presence of contamination on the chip surface and the presence of damage on the chip surface when detached the sealing tape were observed.

The evaluation results for Examples and Comparative Examples are illustrated in Table 3. The evaluation criteria of the evaluation results are as follows.

Presence of Detaching During Storage

A: Sealing tape was detached and ink leakage was not observed.

B: Sealing tape was not detached but floated partly, and was soaked with ink.

C: Sealing tape was detached.

Presence of Damage When Detached

A: Chip surface was not damaged.

C: Damage, such as cracks, was observed on the resin layer that forms the discharge ports.

Presence of Elution into Ink

A: Unable to observe components eluted into ink.

C: Components eluted into ink were observed.

Presence of Contamination on Chip Surface

A: Unable to observe adhering materials remaining on the chip surface.

C: Residues, such as adhering materials, were observed on the chip surface.

TABLE 3

| | Presence of Detaching during Storage | Presence of Damage when detached | Presence of Elution | Presence of Contamination on Chip surface | Detaching strength [N/m] | | Difference between (2) and (1) [N/m] |
|---|---|---|---|---|---|---|---|
| | | | | | (1) Right after adhering | (2) After Storage Test | |
| Example 1 | A | A | A | A | 15 | 45 | 30 |
| Example 2 | A | A | A | A | 35 | 100 | 65 |
| Example 3 | A | A | A | A | 10 | 40 | 30 |
| Example 4 | A | A | A | A | 11 | 50 | 39 |
| Example 5 | A | A | A | A | 30 | 90 | 60 |
| Example 6 | A | A | A | A | 15 | 45 | 30 |
| Example 7 | A | A | A | A | 10 | 42 | 32 |
| Example 8 | A | A | A | A | 10 | 35 | 25 |

TABLE 3-continued

| | Presence of Detaching during Storage | Presence of Damage when detached | Presence of Elution | Presence of Contamination on Chip surface | (1) Right after adhering | (2) After Storage Test | Difference between (2) and (1) [N/m] |
|---|---|---|---|---|---|---|---|
| Example 9 | A | A | A | A | 20 | 60 | 40 |
| Example 10 | A | A | A | A | 30 | 100 | 70 |
| Example 11 | A | A | A | A | 14 | 47 | 33 |
| Example 12 | A | A | A | A | 12 | 50 | 38 |
| Example 13 | A | A | A | A | 10 | 45 | 35 |
| Example 14 | A | A | A | A | 10 | 50 | 40 |
| Example 15 | A | A | A | A | 12 | 51 | 39 |
| Example 16 | A | A | A | A | 15 | 40 | 25 |
| Example 17 | A | A | A | A | 35 | 110 | 75 |
| Example 18 | A | A | A | A | 30 | 80 | 50 |
| Comparative Example 1 | B | A | C | C | 5 | 20 | 15 |
| Comparative Example 2 | C | A | A | A | 0 | — | — |
| Comparative Example 3 | A | A | C | C | 40 | 150 | 110 |
| Comparative Example 4 | B | A | C | C | 5 | 25 | 20 |
| Comparative Example 5 | A | A | A | C | 45 | 120 | 75 |
| Comparative Example 6 | A | A | A | A | 30 | 210 | 180 |
| Comparative Example 7 | A | C | A | — | 410 | 500 | 90 |
| Comparative Example 8 | C | A | C | C | 0 | — | — |
| Comparative Example 9 | C | A | C | C | 0 | — | — |
| Comparative Example 10 | B | A | C | C | 5 | 15 | 10 |
| Comparative Example 11 | C | A | A | A | 0 | — | — |
| Comparative Example 12 | C | A | A | A | 0 | — | — |

For the sealing tapes of Examples 1 to 18, it was observed that during the storage, the sealing tapes were not detached, did not caused ink leakage and had sufficient sealing capabilities for ink discharge ports. Moreover, it was observed that the chip surface was not damaged when detached the sealing tapes. Furthermore, there were no components eluted into ink. Furthermore, there were no contaminations on the chip surface.

The sealing tapes of Examples 1 to 18 showed a detaching strength after the storage test in the range of 35 and 110 N/m and maintained a favorable detaching strength even after the storage test. In addition, the difference in the detaching strengths right after the adhering and after the storage test, namely the increase in the adhesive strength was in the range of 25 and 75 N/m. That is to say, there was a small change in the detaching strengths before and after the storage test. As a result, as illustrated in Examples 1 to 18, it can be understood that the sealing tape according to the present invention can be suitably used for the ink jet recording head.

On the other hand, for Comparative Examples 2, 8, and 9, the sealing tapes were detached during the storage. For Comparative Examples 1, 4, and 10, the sealing tapes floated partly and were soaked with ink. Moreover, for Comparative Example 7, cracks were observed on the resin film that forms the discharge ports. Furthermore, for Comparative Examples 1, 3, 4, 8, 9, and 10, elution of paraffin into ink was observed. In addition, contamination with paraffin was observed on the chip surface. For Comparative Examples 4 and 8, contamination with the terpene-based resin was also observed. Moreover, for Comparative Example 5, residues of adhesive were observed on the chip surface. This is thought to be due to deterioration of the adhesive caused by the ink attack, which caused cohesion failure when detached.

For the sealing tape of Comparative Example 6 without such defects, the detaching strength after the storage test was 210 N/m, and the difference in the detaching strengths right after the adhering and after the storage test was 180 N/m. The temporal change in the detaching strength before and after the storage test was considerably great, and the sealing tape was not suitable for the ink jet recording head.

As described above, it was observed that the sealing tape for the ink jet recording head according to the present invention had a sufficient adhesive strength for sealing discharge ports that discharge ink from an ink jet recording head and was capable of suppressing an increase in the adhesive strength resulting from a temporal change. Moreover, it was observed that the sealing tape was capable of suppressing deterioration of the adhesive resulting from attack of ink components being used and reducing the components eluted from the adhesive, and the ink characteristics were not changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-125327, filed May 25, 2009 which is hereby incorporated by reference herein its entirety.

What is claimed is:

1. A sealing tape for an ink jet recording head, detachably adhered to the surface of a chip which is provided on an ink jet recording head and on which a discharge port for discharging ink is formed, the sealing tape for the ink jet recording head including:
   a base layer; and
   an adhesive layer on the base layer, the adhesive layer comprised of:
   an (A)-(B)-(A) block copolymer which comprises (a) vinyl aromatic compound units and (b) olefinic hydrocarbon units where (A) is a polymer block comprising the (a) units and (B) is a polymer block comprising the (b) units,
   wherein the (A)-(B)-(A) block copolymer is hydrogenated except for its aromatic rings after being polymerized as a block copolymer.

2. The sealing tape for an ink jet recording head according to claim 1,
   wherein the (b) olefinic hydrocarbon units have a cross-linking functional group, and the adhesive layer contains a cross-linking agent that makes a reaction with the cross-linking functional group.

3. The sealing tape for an ink jet recording head according to claim 2, wherein the cross-linking functional group is an epoxy group or an oxetanyl group.

4. The sealing tape for an ink jet recording head according to claim 1,
   wherein the Tg of the polymer block (A) comprising the (a) vinyl aromatic compound units is equal to or higher than 120° C., and
   wherein the Tg of the polymer block (B) comprising the (b) olefinic hydrocarbon units is equal to or lower than 0° C.

5. An ink jet recording head in which the sealing tape for an ink jet recording head according to claim 1 is detachably adhered to the chip surface.

6. The sealing tape for an ink jet recording head according to claim 1, the adhesive layer further comprising polyolefin.

7. The sealing tape for an ink jet recording head according to claim 6, wherein the (A)-(B)-(A) block copolymer is contained with 70 to 100% in the adhesive layer and the polyolefin is contained with 0 to 30% in the adhesive layer.

8. The sealing tape for an ink jet recording head according to claim 6, wherein the polyolefin is polyethylene or polypropylene.

9. The sealing tape for an ink jet recording head according to claim 6, wherein the polyolefin is used as a base resin of the base layer, and the sealing tape is produced by double-layer coextrusion of the adhesive layer and the base layer.

10. The sealing tape for an ink jet recording head according to claim 6, wherein the (A)-(B)-(A) block copolymer is dynamically cross-linked at the time of the double-layer coextrusion of the adhesive layer and the base layer.

11. The sealing tape for an ink jet recording head according to claim 6, wherein the base resin of the base layer is polyethylene or polypropylene.

12. The sealing tape for an ink jet recording head according to claim 1, wherein the content of the (a) vinyl aromatic compound units in the (A)-(B)-(A) block copolymer is 10 to 30 wt %.

13. The sealing tape for an ink jet recording head according to claim 1,
   (a) vinyl aromatic compound units comprised of styrene or 2-methylstyrene;
   (b) olefinic hydrocarbon units comprised of any of ethylene-butylene, ethylene-propylene, ethylene-butylene induced with epoxy group, ethylene-propylene induced with epoxy group or ethylene-butylene induced with oxetanyl group.

14. The sealing tape for an ink jet recording head according to claim 1, wherein the adhesive layer is free from both of paraffin and terpene-based resin.

* * * * *